US008255869B2

(12) United States Patent
Weatherhead (10) Patent No.: US 8,255,869 B2
(45) Date of Patent: Aug. 28, 2012

(54) INDUSTRY TEMPLATE CUSTOMIZATION AND TRANSCLUSION FOR USE IN INDUSTRIAL AUTOMATION AND INFORMATION SOLUTIONS

(75) Inventor: N. Andrew Weatherhead, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1057 days.

(21) Appl. No.: 12/164,901

(22) Filed: Jun. 30, 2008

(65) Prior Publication Data
US 2009/0327991 A1 Dec. 31, 2009

(51) Int. Cl.
*G06F 9/44* (2006.01)
*G06F 19/00* (2011.01)

(52) U.S. Cl. .......................... 717/101; 700/97
(58) Field of Classification Search .......... 717/100–113; 700/97
See application file for complete search history.

(56) References Cited

U.S. PATENT DOCUMENTS

| | | | |
|---|---|---|---|
| 4,536,840 A | 8/1985 | Borta | |
| 4,831,580 A | 5/1989 | Yamada | |
| 5,493,508 A * | 2/1996 | Dangelo et al. | 716/103 |
| 5,870,588 A * | 2/1999 | Rompaey et al. | 703/13 |
| 5,920,718 A | 7/1999 | Uczekaj et al. | |
| 5,966,532 A | 10/1999 | McDonald et al. | |
| 6,053,951 A | 4/2000 | McDonald et al. | |
| 6,117,187 A | 9/2000 | Staelin | |
| 6,163,878 A | 12/2000 | Kohl | |
| 6,170,081 B1 | 1/2001 | Fontana et al. | |
| 6,230,318 B1 | 5/2001 | Halstead et al. | |
| 6,243,857 B1 | 6/2001 | Logan, III et al. | |
| 6,476,828 B1 | 11/2002 | Burkett et al. | |
| 6,564,368 B1 | 5/2003 | Beckett et al. | |
| 6,564,375 B1 | 5/2003 | Jiang | |
| 6,574,791 B1 | 6/2003 | Gauthier et al. | |
| 6,615,198 B1 | 9/2003 | Aldrich | |
| 6,681,383 B1 | 1/2004 | Pastor et al. | |
| 6,816,814 B2 * | 11/2004 | Ebert et al. | 702/182 |
| 6,871,340 B1 | 3/2005 | Gillis | |
| 6,957,418 B2 | 10/2005 | Batcha et al. | |
| 6,980,941 B2 * | 12/2005 | Iwamasa | 703/13 |
| 7,000,219 B2 | 2/2006 | Barrett et al. | |
| 7,047,518 B2 * | 5/2006 | Little et al. | 717/108 |
| 7,076,762 B2 * | 7/2006 | Fisher | 717/102 |
| 7,159,183 B1 | 1/2007 | Kudukoli et al. | |
| 7,210,117 B2 | 4/2007 | Kudukoli et al. | |
| 7,243,334 B1 | 7/2007 | Berger et al. | |
| 7,266,806 B2 * | 9/2007 | Choi et al. | 717/108 |
| 7,299,155 B2 * | 11/2007 | Ebert et al. | 702/182 |

(Continued)

OTHER PUBLICATIONS

Sidhu, Deepinder P., "Logic Programming Applied to Hardware Design Specification and Verification," 1984, IEEE, p. 309-313.*

(Continued)

*Primary Examiner* — Wei Zhen
*Assistant Examiner* — Qing Chen
(74) *Attorney, Agent, or Firm* — Turocy & Watson, LLP; William R. Walburn; John M. Miller (57) ABSTRACT

The invention relates to a system and/or methodology for the customization and transclusion of design templates/patterns for use in industrial automation. The system provides for the de-abstraction of one or more design templates, and generating engineering specifications via customization of the de-abstracted design templates. Additionally, the invention provides a user interface for modification of the template de-abstraction and/or customization process.

25 Claims, 9 Drawing Sheets

U.S. PATENT DOCUMENTS

| | | | |
|---|---|---|---|
| 7,340,684 B2 | 3/2008 | Ramamoorthy et al. | |
| 7,356,773 B1 | 4/2008 | Barraclough | |
| 7,464,365 B2 * | 12/2008 | Iwamasa et al. | 717/100 |
| 7,571,419 B2 * | 8/2009 | O'Brien | 716/53 |
| 7,650,588 B2 * | 1/2010 | Ivansen | 716/50 |
| 8,146,061 B2 * | 3/2012 | Xu et al. | 717/135 |
| 2001/0025236 A1 | 9/2001 | America | |
| 2002/0091990 A1 * | 7/2002 | Little et al. | 717/105 |
| 2002/0103558 A1 * | 8/2002 | Iwamasa | 700/97 |
| 2003/0028408 A1 * | 2/2003 | RuDusky | 705/8 |
| 2003/0033234 A1 * | 2/2003 | RuDusky | 705/37 |
| 2003/0055658 A1 * | 3/2003 | RuDusky | 705/1 |
| 2003/0055769 A1 * | 3/2003 | RuDusky | 705/37 |
| 2003/0055770 A1 * | 3/2003 | RuDusky | 705/37 |
| 2003/0055771 A1 * | 3/2003 | RuDusky | 705/37 |
| 2003/0061409 A1 * | 3/2003 | RuDusky | 710/8 |
| 2003/0066057 A1 * | 4/2003 | RuDusky | 717/140 |
| 2003/0188291 A1 * | 10/2003 | Fisher | 717/102 |
| 2004/0093186 A1 * | 5/2004 | Ebert et al. | 702/186 |
| 2004/0163072 A1 * | 8/2004 | Levy | 717/106 |
| 2005/0091618 A1 * | 4/2005 | Ebert et al. | 716/4 |
| 2005/0138603 A1 | 6/2005 | Cha et al. | |
| 2005/0198611 A1 * | 9/2005 | Ebert et al. | 717/100 |
| 2005/0198615 A1 * | 9/2005 | Choi et al. | 717/108 |
| 2005/0216887 A1 * | 9/2005 | Robertson et al. | 717/113 |
| 2005/0221266 A1 * | 10/2005 | Mislevy et al. | 434/322 |
| 2007/0130558 A1 * | 6/2007 | Ivansen | 716/19 |
| 2007/0214449 A1 * | 9/2007 | Choi et al. | 717/100 |
| 2008/0127040 A1 | 5/2008 | Barcellona | |
| 2008/0195994 A1 * | 8/2008 | O'Brien | 716/19 |
| 2008/0301626 A1 | 12/2008 | Sivaram | |
| 2009/0158257 A1 * | 6/2009 | Xu et al. | 717/129 |

OTHER PUBLICATIONS

Mir et al., "Re-engineering Hardware Specifications by Exploiting Design Semantics," 1994, ACM, p. 336-341.*

Gajski et al., "Specification and Design of Embedded Hardware-Software Systems," 1995, IEEE, p. 53-67.*

OA dated Oct. 19, 2011 for U.S. Appl. No. 12/164,724, 34 pages.

* cited by examiner

INDUSTRY TEMPLATE CUSTOMIZATION AND TRANSCLUSION FOR USE IN INDUSTRIAL AUTOMATION AND INFORMATION SOLUTIONS

TECHNICAL FIELD

The subject invention relates generally to industrial automation design, and more particularly industrial automation design via design pattern customization and transclusion.

BACKGROUND

Industrial Automation has revolutionized manufacturing in a rapidly expanding range of applications. As engineers strive to create systems of ever increasing complexity, the development of new and innovative information solutions has become more essential. Increases in computer networking capability, processing power, and storage capacity have made faster, smarter and more reliable automation systems possible. However, the efficiency at which the systems can be designed, programmed, and installed has largely lagged behind the pace at which the automation systems themselves are improving.

Currently, industrial automation designers, programmers, and engineers are often required to reengineer identical or similar components repeatedly for different projects. In addition, frequently a high degree of redundancy exists between the designs of components for unrelated projects. This redundancy can be caused by industry specific, customer specific, and/or application specific requirements.

The continual reinventing and reengineering of identical or similar components is highly inefficient. Moreover, due to the high degree of redundancy the constant rehashing of similar subject matter is wholly unnecessary. Consequently, a substantial need exists for an industrial automation information solution that reduces the necessity for reengineering and increases efficiency.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The claimed subject matter relates to a system and/or method for the transclusion and customization of design templates. In accordance with various aspects of the claimed subject matter, a transclusion component acquires one or more design templates. The design templates are essentially abstracted engineering specifications containing generic design elements.

The transclusion component de-abstracts the design templates by appending one or more class specific layers to the design templates. The class specific layers include class specific definitions, which define one or more class specific requirements. Consequently, appending the class specific layers to the design templates adds class specific requirements to the generic design elements and de-abstracts the design templates.

A customization component customizes the de-abstracted design templates based at least in part on a set of user requirements, a functional specification, or user input. The customization component can also generate one or more engineering specifications based at least in part on the customized de-abstracted design templates.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are illustrated in block diagram form in order to facilitate describing the embodiments.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom. For instance, by observing that one user interacts with a subset of other users over a network, it may be determined or inferred that this subset of users belongs to a desired social network of interest for the one user as opposed to a plurality of other users who are never or rarely interacted with.

Figure 1:
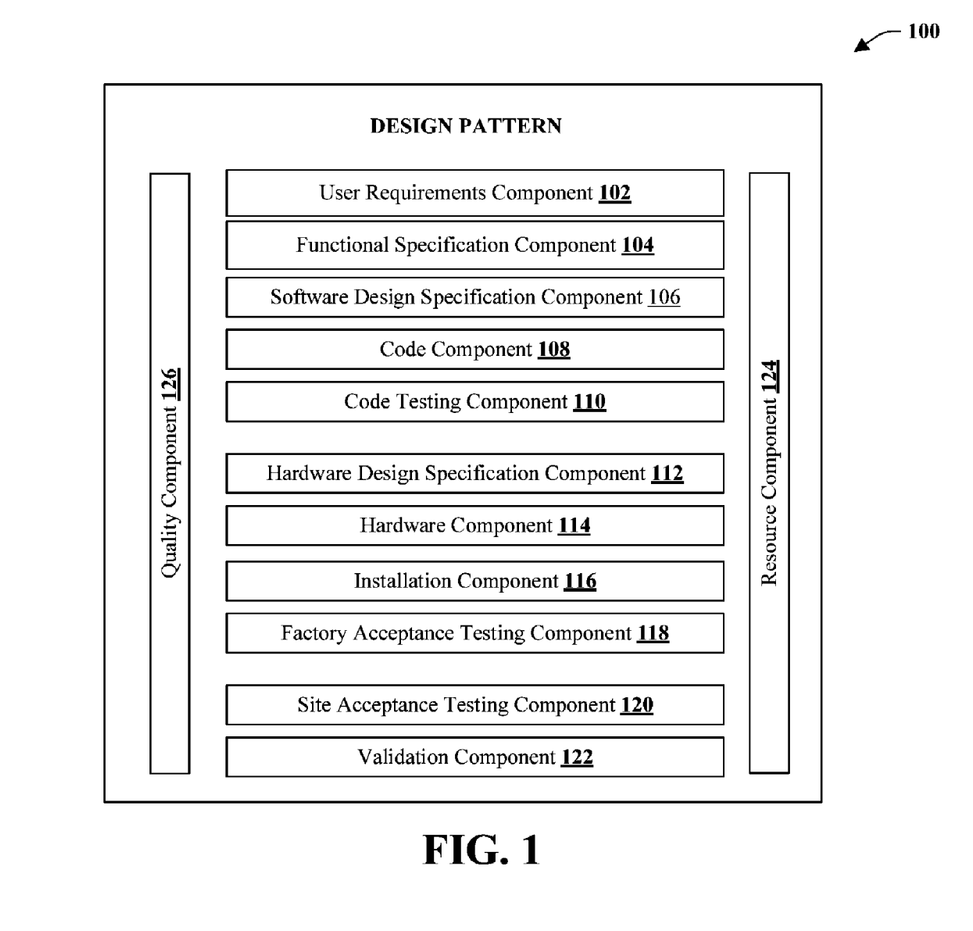
FIG. 1 is an exemplary illustration of a design pattern shown in accordance with an aspect of the present invention.

Referring initially to FIG. 1, an exemplary illustration of a design pattern 100 is shown in accordance with an aspect of the present invention. The design pattern 100 is an abstracted collection of sub-components containing generic design elements. The sub-components can include but are not limited to a user requirements component 102, a functional specification component 104, a software design specification component 106, a code component 108, a code testing component 110, a hardware design specification component 112, a hardware component 114, an installation component 116, a factory acceptance and testing component 118, a site acceptance and testing component 120, and a validation component 122, a resource component 124, and a quality component 126. It is to be appreciated that the terms design pattern and design template are used interchangeably herein.

The user requirements component 102 obtains one or more user requirements. The user requirements can be obtained from a set of inputs, including explicit user inputs (e.g., configuration selections, question/answer) such as from mouse selections, keyboard selections, speech, scanner and so forth. Additionally or alternatively, the user requirements can be obtained via data transfer from a user computer, a third party computer, an associated computer, a data store, etc. Typically, the user requirements include general information regarding the objectives and goals of the user's project or group of projects. For example, the user requirements can state that the goal of a particular project is to manufacture widgets. Additionally, the user requirements can include quality specifications such as the rate at which the widgets need to be manufactured, the size of the widgets, quality tolerances, etc.

The functional specification component 104 generates one or more functional specifications based on the user requirements, wherein a functional specification is a generic list of equipment required to achieve the described functionality. For example, the functional specification component 104 can determine the engineering processes necessary to make the specified number of widgets, at the specified rate, within said quality tolerances. The functional specifications can include the equipment to be used, the sequence of operations, process inputs and outputs, process parameters, process data, operator interaction, and so forth.

The software design specification component 106 generates one or more software design specifications based on the functional specifications, wherein the software design specifications relate the abstract description in the functional specification to concrete instances of modules within the software. The software design specifications are high-level (e.g. generic) representations illustrative of a sequence of events, and handling of exceptions, that can be translated into computer executable commands. The software design specifications can be illustrated via block diagrams, flow charts, drawings (e.g. S88 batch-control-process-requirements).

The code component 108 generates pre-built modules of software designed for the abstract which accept the entity relationship defined by the software design specification component 106. The high-level representations contained in the software design specifications are mapped to functions and/or computer executable commands. For example, the software design specification may require a motor to be run at a speed X. The code component 108 can generate the software code necessary to run the motor at speed X. Additionally or alternatively, the code component 108 can generate the code based at least in part on one or more design patterns. For example, if the functional specification requires a type 1 motor to be run at speed X, then the code component 108 can obtain a template regarding running a type 1 motor, and modify the design pattern to operate the motor at speed X.

The code testing component 110 tests the software code generated by the code component 108. The code testing component 110 can test the code to ensure it provides each function outlined in the functional specification(s). The code testing component may not need to test every instance of code, because a given project may require multiple instances of the same code. For instance, a functional specification may require a series of flow meters to perform an operation. The software design specification component 106 and code component 108 can handle each instance of a flow meter in a similar manner, resulting in multiple instances of similar or identical software code. Consequently, the code testing component 110 may only be required to check a single instance of a flow meter to ensure that all related flow meter codes are functioning correctly. Moreover, the code testing component 110 can produce one or more testing specifications. The testing specifications detail a testing schema, and are based at least in part on the functional specifications, and software design specifications. Additionally, for each test performed the code testing component 110 can subsequently generate one or more testing reports that detail the results of the tests. The testing reports including but not limited to errors, warnings, accuracy, possible solutions, expected results, actual results, etc.

The hardware design specification component 112 generates one or more hardware design specifications based on the functional specifications and/or software design specifications. The hardware design specifications are high-level representations of one or more hardware modules, and configurations of the modules, designed to execute the objectives of the functional specification and/or the software design specifications. For example, if the functional specifications and software design specifications require a flow meter, the hardware design specification component 112 can determine the inputs and outputs (I/O) required for the flow meter, the network(s) that must to be connected to the I/O points, whether a control cabinet is necessary, and so forth. The hardware design specifications can be illustrated as drawings (e.g. electrical drawings, mechanical drawings, etc.), flowcharts, block diagrams, etc.

Additionally, the hardware design specification component 112 can add one or more additional specification requirement layers, including but not limited to customer specific requirements, industry specific requirements, application specific requirements, and/or project specific requirements. For example, if the project is for an industry that requires explosion proof materials, then the design specification component 112 can add a corresponding industry specific requirements layer to the hardware design specifications. Similarly, if a customer has specific requirements, then an appropriate customer requirements layer can be added to the hardware design specification.

The hardware component 114 can generate a comprehensive list of the hardware required for the project based on the hardware design specifications. The list can be a bill of materials (B.O.M.), wherein the B.O.M. can include but is not limited to part names, quantities, part numbers, manufacturers, etc.

The installation component 116 can generate one or more installation specifications based on the hardware design specifications and the B.O.M. The installation specifications detail specifications of materials necessary to install the hardware modules, including but not limited to runs of wire, termination boxes, wiring specifications, conduit specifications, piping, definitions, etc.

The factory acceptance testing component 118 can qualify a design build prior to installation, including any prebuilt software or hardware modules. For example, the factory acceptance testing component 118 can test the I/O, communications, controls, and so forth of prebuilt software modules and control panels. In addition, the site acceptance testing component 120 can test software or hardware modules during or after the installation. For example, the site acceptance testing component 120 can test the I/O, communications, controls, and so forth once installation of the project is complete.

The validation component 122 validates test results from the factory acceptance testing component 118 and site acceptance testing component 120. Additionally, the validation component 122 can ensure that each element of the software design and hardware design specifications operate as intended. For example, the validation component may be particularly useful for life sciences based projects, where simply testing the design is insufficient, and validation of the test results is required.

The resource component 124 determines a cost amount (e.g. money, time, etc.) for a given project or set of projects. The resource component 124 can represent the cost amount as a maximum value, a minimum value, a target value (e.g. set point), a percentage value, a distribution, a state value (e.g. low, medium, or high), etc. The resource component 124 can determine the cost amount based on the user requirements and/or functional specification. Additionally or alternatively, the resource component 124 can infer the cost amount. The cost amount can be used by both the one or more other components in order to generate the engineering specifications. For example, the resource component 124 can determine that the maximum amount for a project is $10,000. The software design specification component 106, the hardware design specification component 112, and the hardware component 114 will maintain an aggregate cost of less than or equal to the maximum amount of $10,000.

The quality component 126 determines a quality metric based at least in part on the user requirements. The quality metric can be a real number, a target, a percentage, a distribution, a state (e.g. low, medium, or high), etc. The quality metric can be determined based on the user requirements and/or functional specifications, and can be one or more additional sub-components. For example, the quality component 126 can determine that the quality metric should be "high." Subsequently, the other sub-components will adapt their designs to accommodate the quality metric by using only modules, parts, etc. designated as "high" quality. It is appreciated that the quality component 126 and resource component 124 can be related, because typically there is a correlation between resources and quality. For example, as the cost of the modules increases presumably the quality does as well, and vice versa. Therefore, it may be desirable to integrate the resource component 124 and quality component 126.

Figure 2:
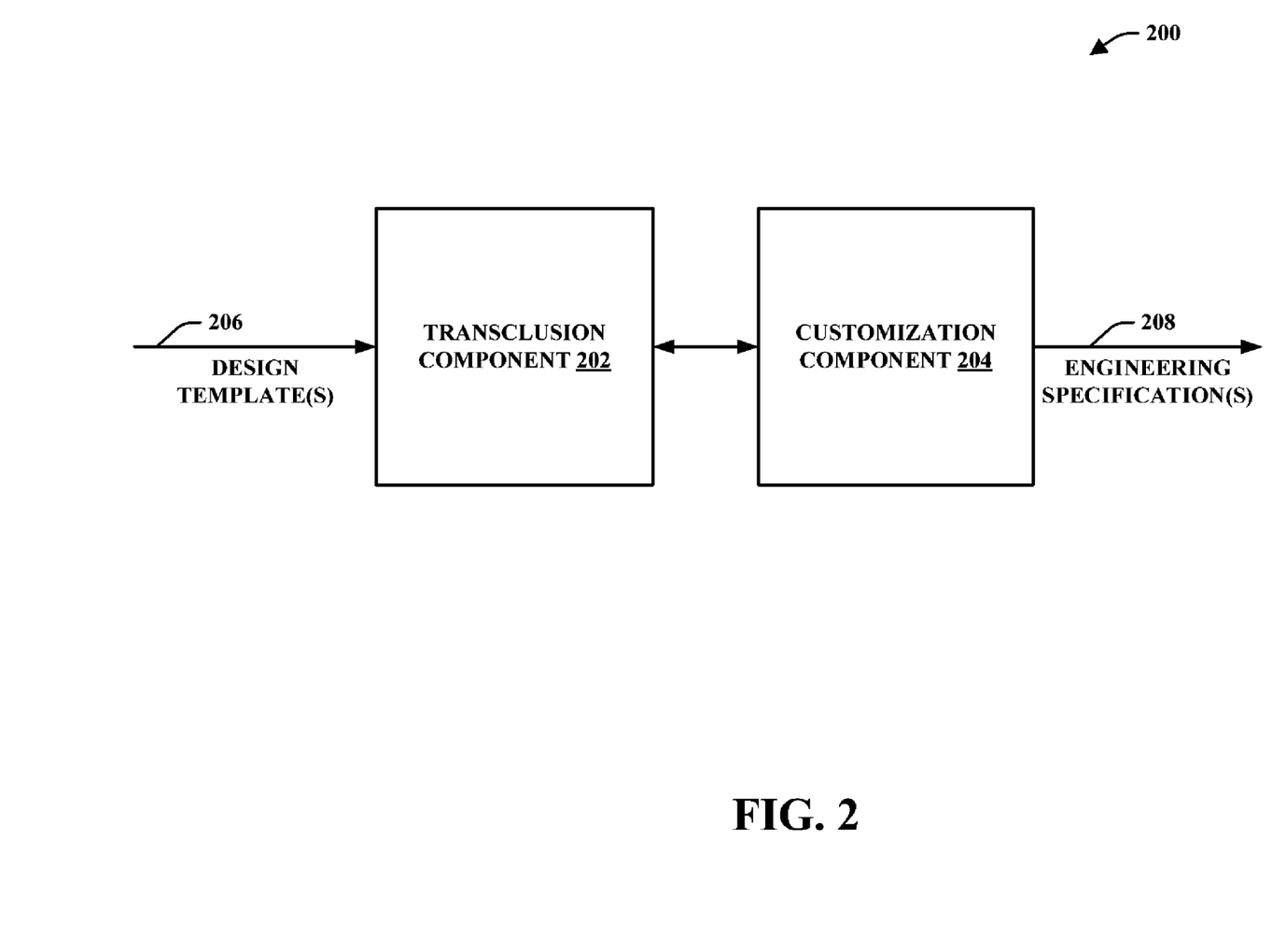
FIG. 2 is a general component block diagram illustrating a system for the customization and transclusion of design templates in accordance with an aspect of the present invention.

Referring to FIG. 2, a template transclusion and customization system 200 is illustrated in accordance with an aspect of the subject invention. The system 200 includes a transclusion component 202, and a customization component 204. The transclusion component 202 obtains one or more templates 206. The design templates 206 can be acquired via various means. For instance, the design templates can be acquired via user inputs, data transfers (from end users, third parties, associated applications, vendors, manufacturers, etc.), and so forth. The design templates (e.g. Design Patterns 000) 206 are in essence an abstracted collection of sub-components, containing generic design elements (see FIG. 1).

The transclusion component 202 de-abstracts the design templates 206 by appending one or more class specific layers thereto. The class specific layers contain one or more sub-components which are associated with the design pattern (e.g. design templates) sub-components (discussed infra). The class specific layers can include but are not limited to an industry specific layer, a customer specific layer, an application specific layer, and a project specific layer. The class specific layers contain class specific definitions, which define one or more class specific requirements. Consequently, appending one or more class specific layers to the design templates 206 adds specific requirements to the generic design elements, thus de-abstracting the design templates 206. For example, the transclusion of the Flow Meter Design Pattern (discussed supra), may be as follows: The industry specific layer may include certain regulatory details specific to a given industry, the customer specific layer may include pre-selected vendors for the equipment defined or a particular data set expected from the software, the application specific layer may include details such as environmental details (e.g. explosive environment), and the project specific layer may add specific equipment configuration details to match the actual physical equipment configuration.

The de-abstracted design templates are communicated to the customization component 204. The customization component 204 can create one or more engineering specifications 208 (discussed infra) based on the de-abstracted design templates. In addition, the customization component provides for adjustment/customization of any sub-components associated with the de-abstracted design template, or any class specific layer associated with the de-abstracted design template based at least in part on a set of user inputs, one or more data transfers, or a customization schema. For example, a modification of the existing hardware design, software design, and so forth, can be required to suit actual installation conditions which were not factored into the original design. In another example, the installation component of the design pattern, containing any number of class layers, can require certain software applications to be installed. The customization component 204 may describe the operating system and/or asset tag associated with the equipment to which the software would be installed. For simplicity of explanation, the systems and methodologies contained herein are described in terms of engineering specifications, however it is to be appreciated that a plurality of types of specifications can be used within the scope of this invention, such as design specifications, marketing specifications, general specifications, and so forth.

Figure 3:
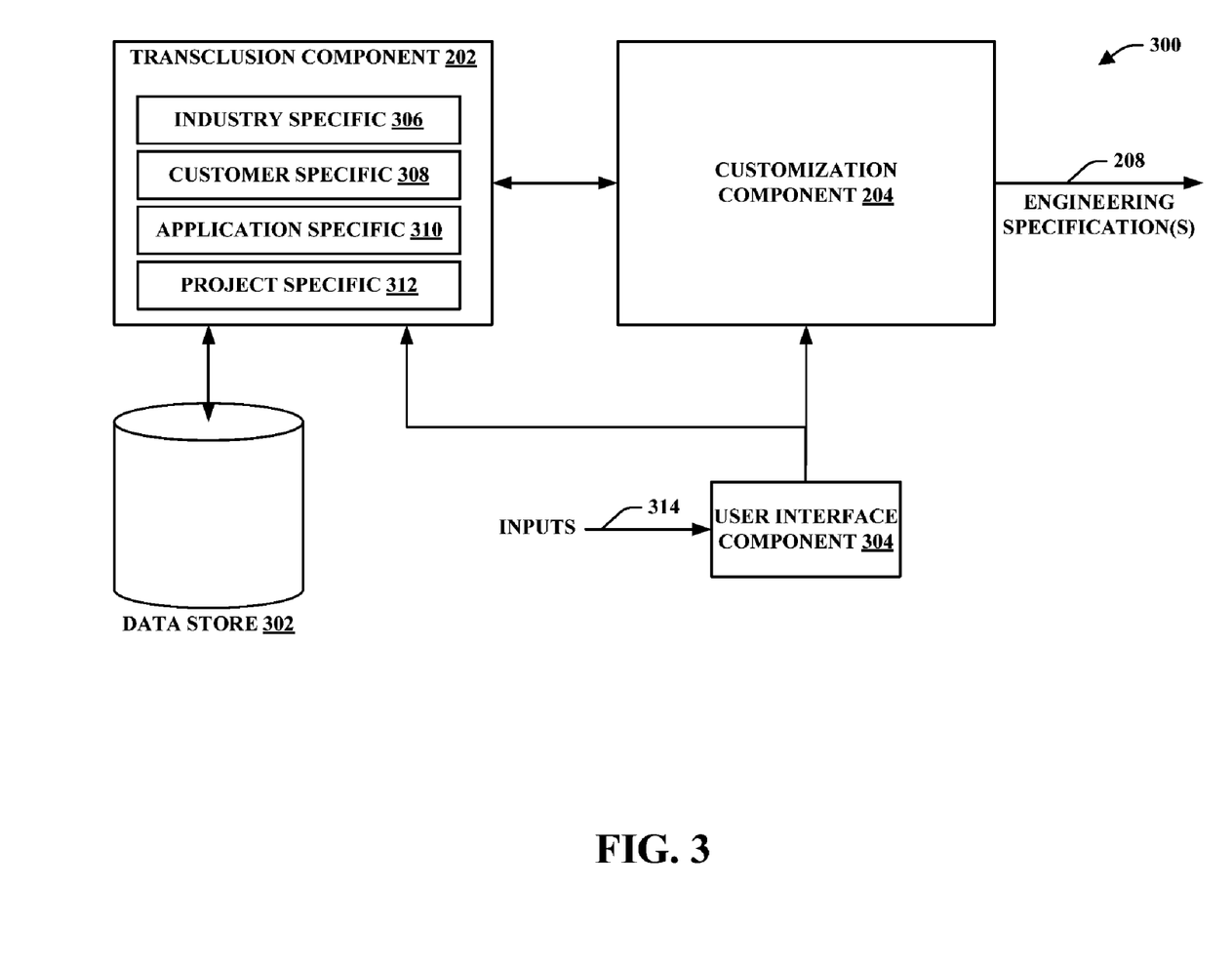
FIG. 3 is a general component block diagram illustrating a system for the customization and transclusion of design templates in accordance with an aspect of the present invention.

Referring to FIG. 3, a template transclusion and customization system 300 is illustrated in accordance with an aspect of the subject invention. The system 300 includes a transclusion component 202, a customization component 204, a data store 302 and a user interface component 304. The transclusion component 202 includes an industry specific layer component 306, a customer specific layer component 308, an application specific layer component 310, and a project specific layer component 312.

The transclusion component 202 collects one or more design templates. The design templates can be obtained from various sources. For instance, the design templates can be acquired from the data store 302, user inputs, data transfers (from end users, third parties, associated applications, vendors, manufacturers, etc.), and so forth.

The transclusion component 202 de-abstracts the design templates, by appending one or more class specific layers thereto (discussed infra). The class specific layers contain class specific definitions, which define class specific requirements. Attaching one or more class specific layers to the design templates adds class specific requirements to the generic design elements, thus de-abstracting the design templates. The class specific layers can include but are not limited to an industry specific layer, a customer specific layer, an application specific layer, and a project specific layer.

The industry specific layer component 306 can include one or more sub-components associated to the sub-components defined in the design patterns (e.g. user requirements, functional specification, software design, code, code testing, hardware design specification, hardware, installation, factory acceptance testing, site acceptance testing, and/or validation components). The industry specific layer component 306 can obtain one or more industry specific layers, and append the industry specific layers to the design patterns. The industry specific layers contain industry specific definitions, which define the industry specific requirements, functionality, design, etc. For example, a subject industry may require the use of explosion resistant equipment, or certain regulatory/environmental controls, which are defined by the industry specific layer.

The customer specific layer component 308 can include one or more sub-components associated to the sub-components defined in the design patterns (e.g. user requirements, functional specification, software design, code, code testing, hardware design specification, hardware, installation, factory acceptance testing, site acceptance testing, and/or validation components). The customer specific layer component 308 can obtain one or more customer specific layers and attach the customer specific layers to the design templates. The customer specific layers contain customer specific definitions, which define the customer specific requirements. For example, a customer may require the use of only Allen Bradley Programmable Logic Controllers (PLCs), or the customer may have specific sustainability requirements, and these requirements, functions, designs, etc. are defined by the customer specific layer.

The application specific layer component 310 can include one or more sub-components associated to the sub-components defined in the design patterns (e.g. user requirements, functional specification, software design, code, code testing, hardware design specification, hardware, installation, factory acceptance testing, site acceptance testing, and/or validation components). The application specific layer component 310 can obtain one or more application specific layers, and append the application specific layers to the design templates. The application specific layers contain application specific definitions, which define the application specific requirements. For example, a particular application may require the use of a certain type of wire, or a certain grouping of equipment, and these requirements are defined by the application specific layer.

The project specific layer component 312 can include one or more sub-components associated to the sub-components defined in the design patterns (e.g. user requirements, functional specification, software design, code, code testing, hardware design specification, hardware, installation, factory acceptance testing, site acceptance testing, and/or validation components). The project specific layer component 312 can obtain one or more project specific layers and attach the project specific layers to the design templates. The project specific layers contain project specific definitions, which define the project specific requirements. For example, a project may require a particular set of process data, and said process data can be defined by the project specific layer.

The class specific layers can be acquired via various means. For instance, the class specific layers can be acquired via user inputs, data transfers (end user, third party, associated applications, vendor, manufacturer, etc.), and so forth. The transclusion component 202 can determine the class specific layers to attach to the design templates based at least in part on one or more user requirements, class requirements, and/or user input.

The de-abstracted design templates are communicated to the customization component 204. The customization component 204 can generate engineering specification(s) 208 based at least in part on the de-abstracted design templates. Additionally, the customization component 204 enables modification/customization of any sub-components of the de-abstracted design template, or any class specific layer associated with the de-abstracted design templates, wherein the customization can be based at least in part on a set of user inputs, one or more data transfers, or a customization schema (discussed supra). It is to be appreciated that not every instance of a de-abstracted design template requires customization, and the engineering specification 208 can be based solely on the de-abstracted design template.

The user interface component 304 receives a set of inputs 314, the inputs 314 can include explicit user inputs (e.g., configuration selections, question/answer) such as from mouse selections, keyboard selections, speech, and so forth. The user interface component 304 enables user interaction with at least one of: the transclusion component 202, the customization component 204, and the data store 302. For example, the user interface component 304 can enable modification of the customization and transclusion process (e.g. engineering specification generation process), including selection of the design template, the de-abstraction of the design templates, and customization of the de-abstracted design templates. Additionally, the user interface component 304 can enable a user to determine the class specific layers to append to a design pattern, or determine a transclusion and/or customization schema. The user interface component 304 communicates with a user or operator via any means known in the art, including but not limited to a series of graphical user interfaces (GUI). The GUI can graphically represent the engineering specification generation process, including but not limited to the design templates 106, de-abstraction of the design templates 106, template customization, the user requirements, the functional specifications, and storing and/or retrieving via data the data store 314.

Figure 4:
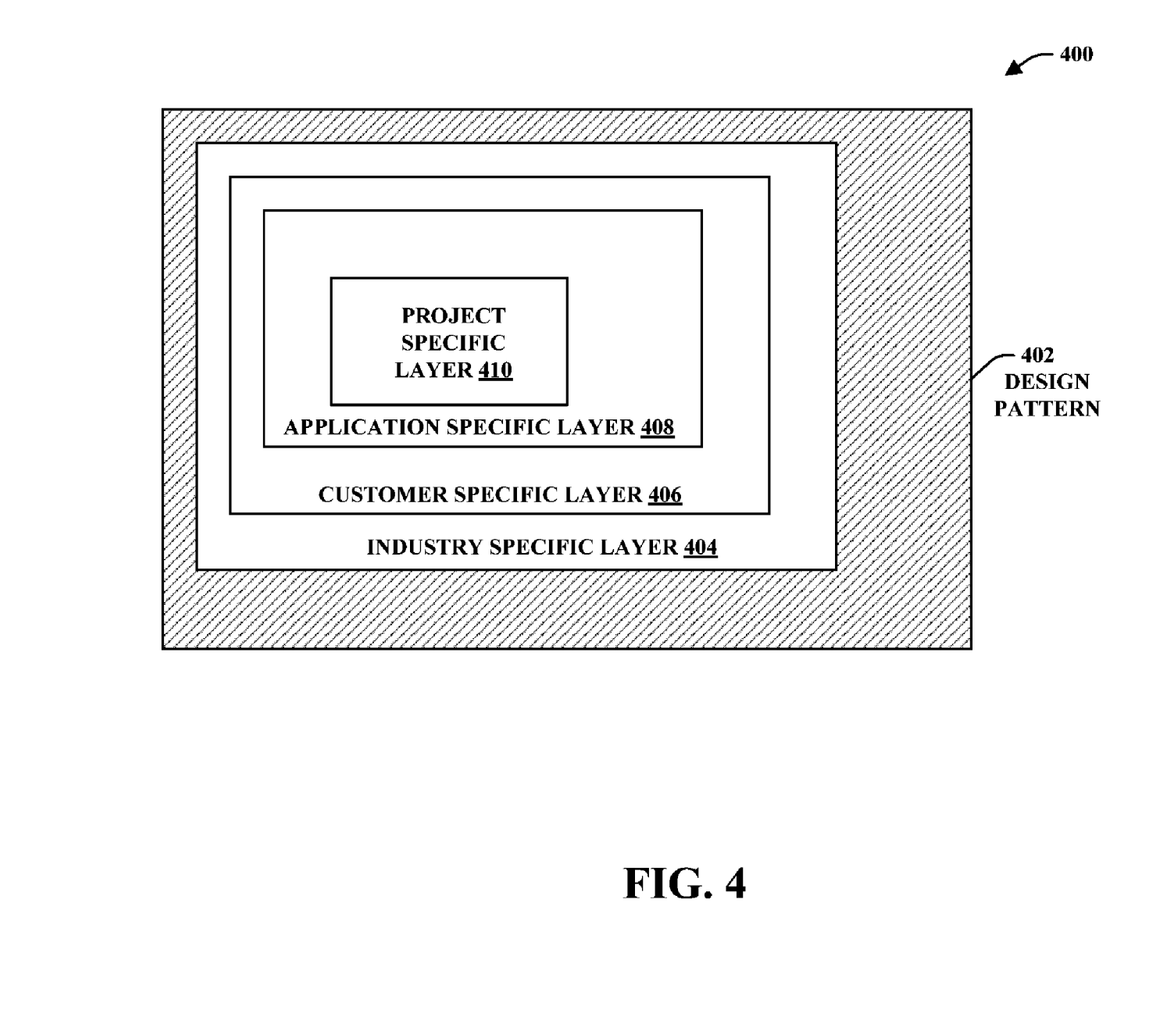
FIG. 4 is an exemplary illustration of design pattern transclusion in accordance with an aspect of the present invention.

Referring to FIG. 4, an exemplary illustration of design pattern 402 transclusion is shown in accordance with an aspect of the present invention. The design patterns 402 are in essence abstracted collections of sub-components having generic design elements (discussed supra). The design pattern 402 can be de-abstracted by appending one or more class specific layers (discussed supra). The class specific layers include an industry specific layer 404, a customer specific layer 406, an application specific layer 408, and a project specific layer 410. For instance, an engineering specification can require a customer specific layer 406, wherein the customer specific layer 406 includes a set of customer specific definitions. The customer specific definitions can include various requirements, and adding the customer specific layer 406 de-abstracts the design pattern 402 by adding the customer specific definitions to the generic sub-components.

Figure 5:
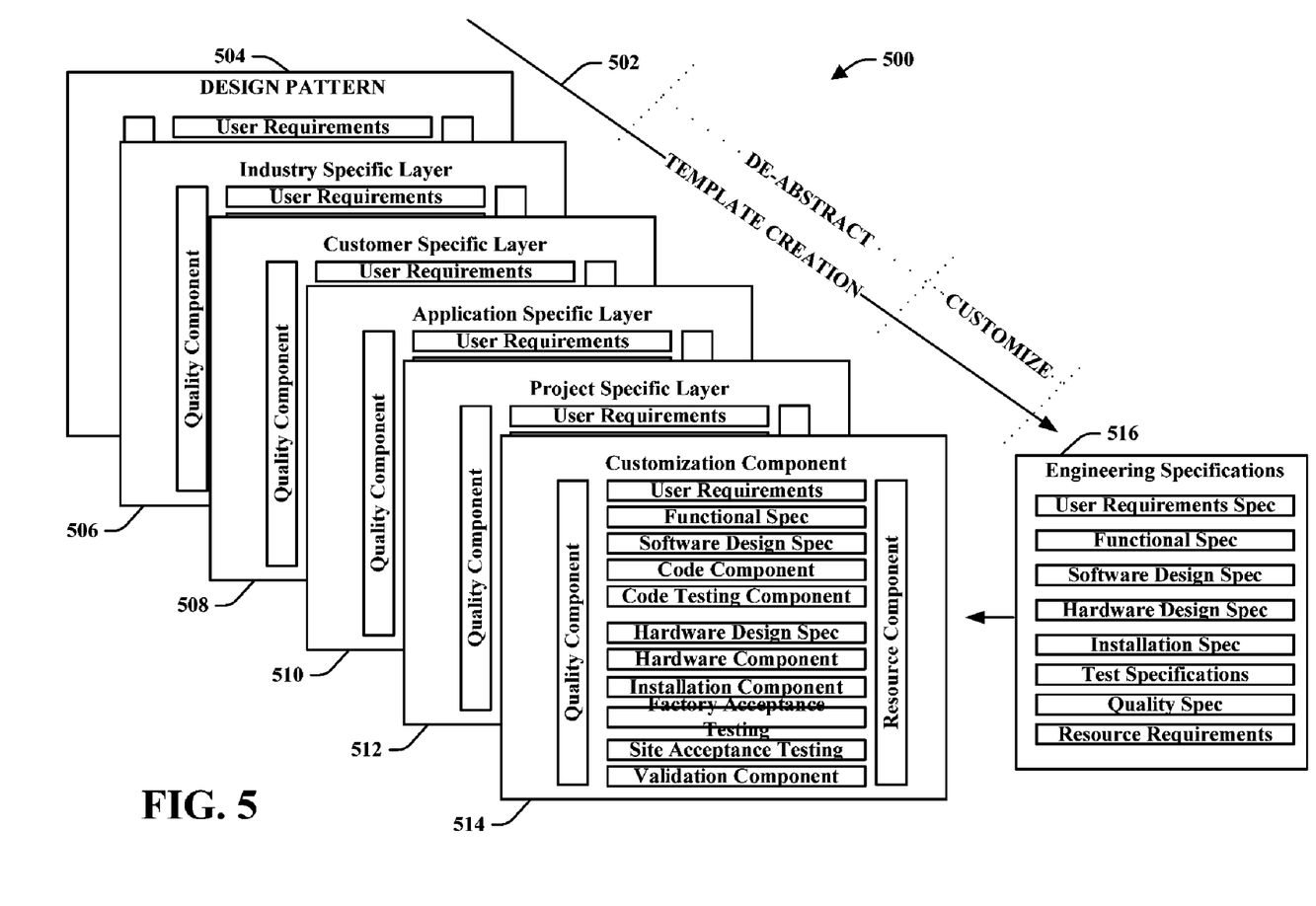
FIG. 5 is an exemplary process for design pattern transclusion and customization in accordance with an aspect of the present invention.

Referring to FIG. 5, an exemplary process 500 for design pattern transclusion and customization is shown in accordance with an aspect of the present invention. The process 500 is illustrated as proceeding along a transclusion indicator 502 from the most generic application (e.g. design pattern) to the most specialized application (e.g. engineering specification). The process 500 commences with a design pattern 504. The design pattern 504 is a compilation of sub-components having abstract design elements (discussed supra). The design pattern 504 can be de-abstracted by appending one or more class specific layers thereto. As previously discussed, attaching one or more class specific layers de-abstracts the design pattern 504 by adding class specific definitions to the generic design elements. The class specific layers can include but are not limited to an industry specific layer 506, a customer specific layer 508, an application specific layer 510, and a project specific layer 512. Additionally, the class specific layers can include one or more sub-components. For instance, the class specific layers can include sub-components associated with the sub-components contained in the design pattern 504 (discussed supra). The de-abstracted design patterns can be customized via a customization component 514. The customization component 514 enables customization and/or modification of any of the sub-components contained in the de-abstracted design pattern 504. The customized and/or de-abstracted design pattern 504 is used to generate a set of engineering specifications 516. The engineering specifications 516 include the results of the customized and de-abstracted design pattern 504. For instance, the initial design pattern 504 can include a functional specification component (discussed supra), and the de-abstracted and customized functional specification component generates a functional specification that is included in the engineering specifications 516.

Figure 6:
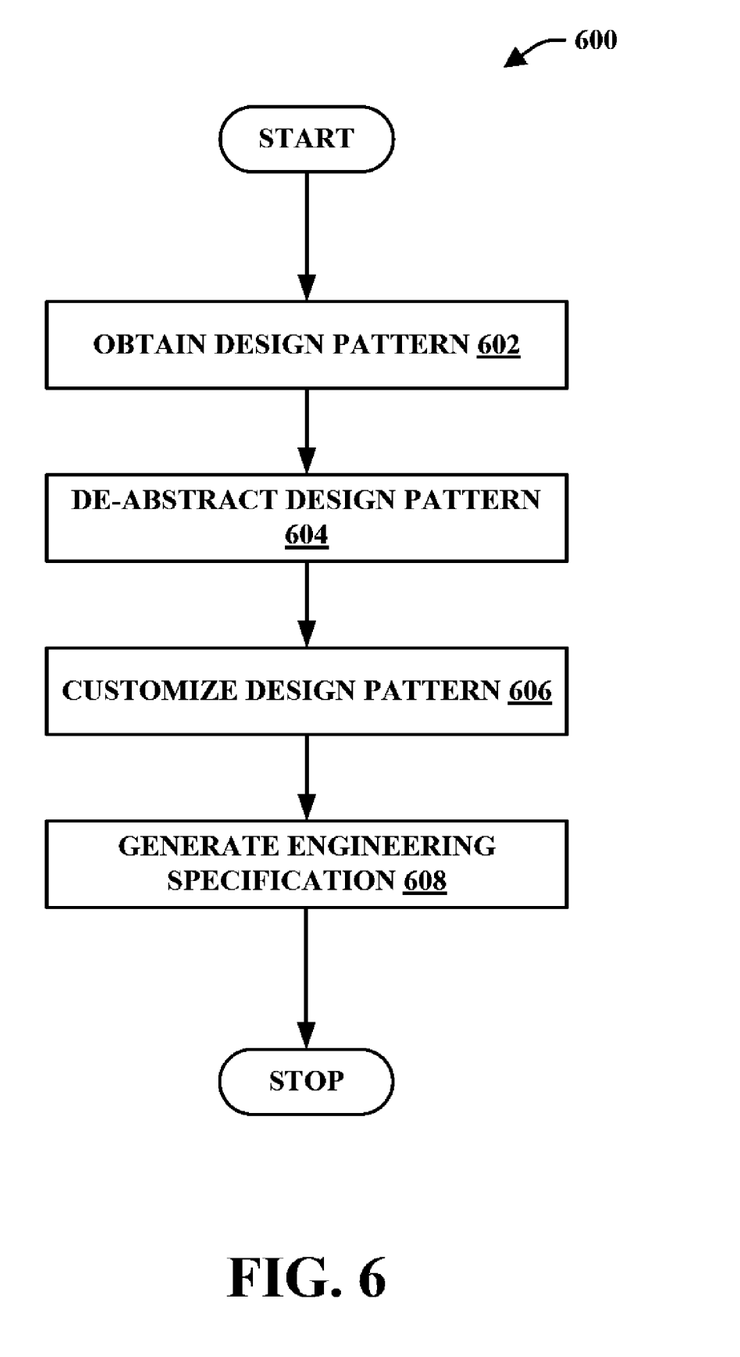
FIG. 6 is a flow chart illustrating a generalized methodology of generating an engineering specification in accordance with the present invention.

In view of the exemplary systems described supra, a methodology that may be implemented in accordance with the disclosed subject matter will be better appreciated with reference to the flow chart of FIG. 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, the illustrated blocks do not represent all possible steps, and not all illustrated blocks may be required to implement the methodologies described hereinafter.

FIG. 6 illustrates a methodology 600 that facilitates template transclusion and customization. At 602, one or more design templates is acquired. The design templates can be obtained from various sources. For instance, the design templates can be acquired from a data store, user inputs, data transfers (from end users, third parties, associated applications, vendors, manufacturers, etc.), and so forth.

At 604, the design templates can be de-abstracted by appending one or more class specific layers. The class specific layers contain class specific definitions, wherein the definitions include various requirements of the classes. The class specific layers can include but are not limited to a customer specific layer, an industry specific layer, a project specific layer, and an application specific layer.

The de-abstracted design templates can be customized at 606. The de-abstracted design templates can be customized by tailoring the generic design elements of the design template for the specific project, situation, user, etc.

At 608, one or more engineering specifications are generated based at least in part on the customized and de-abstracted design templates. The engineering specifications represent the customized and de-abstracted sub-components of the design pattern.

Figure 7:
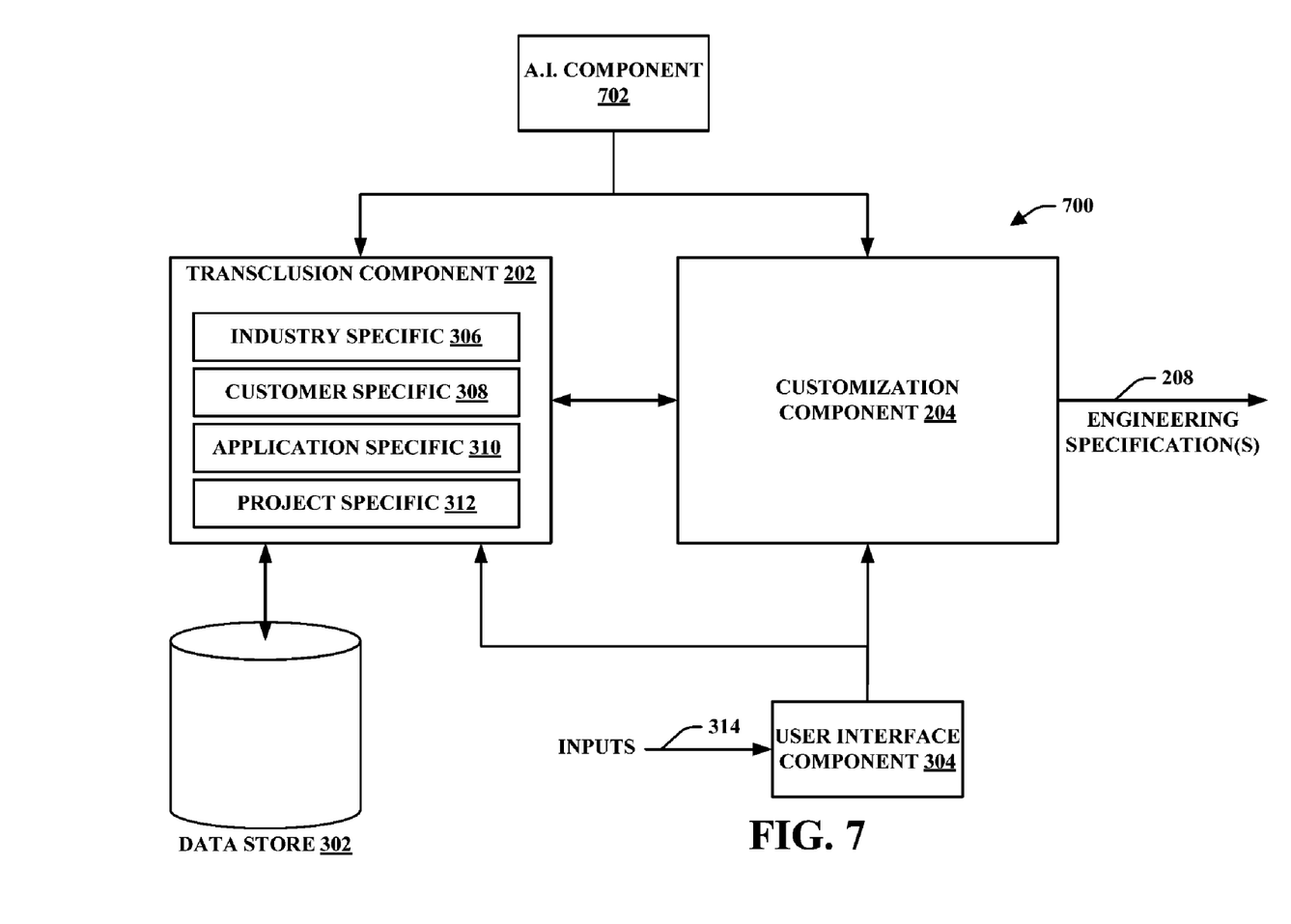
FIG. 7 illustrates a system that employs an artificial intelligence component which facilitates automating one or more features in accordance with the subject invention.

FIG. 7 illustrates a system 700 that employs an artificial intelligence (AI) component 702 which facilitates automating one or more features in accordance with the subject invention. The subject invention (e.g., in connection with inferring) can employ XML schema's and various AI-based schemes for carrying out various aspects thereof. For example, a process for appending one or more class specific layers to a design template can be facilitated via an automatic classifier system and process. Additionally, the engineering processes and methodologies described herein could be decomposed into a series of Holonic agents representing engineering methods and content, and the AI component can function as a mechanism to employ the agents.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 8:
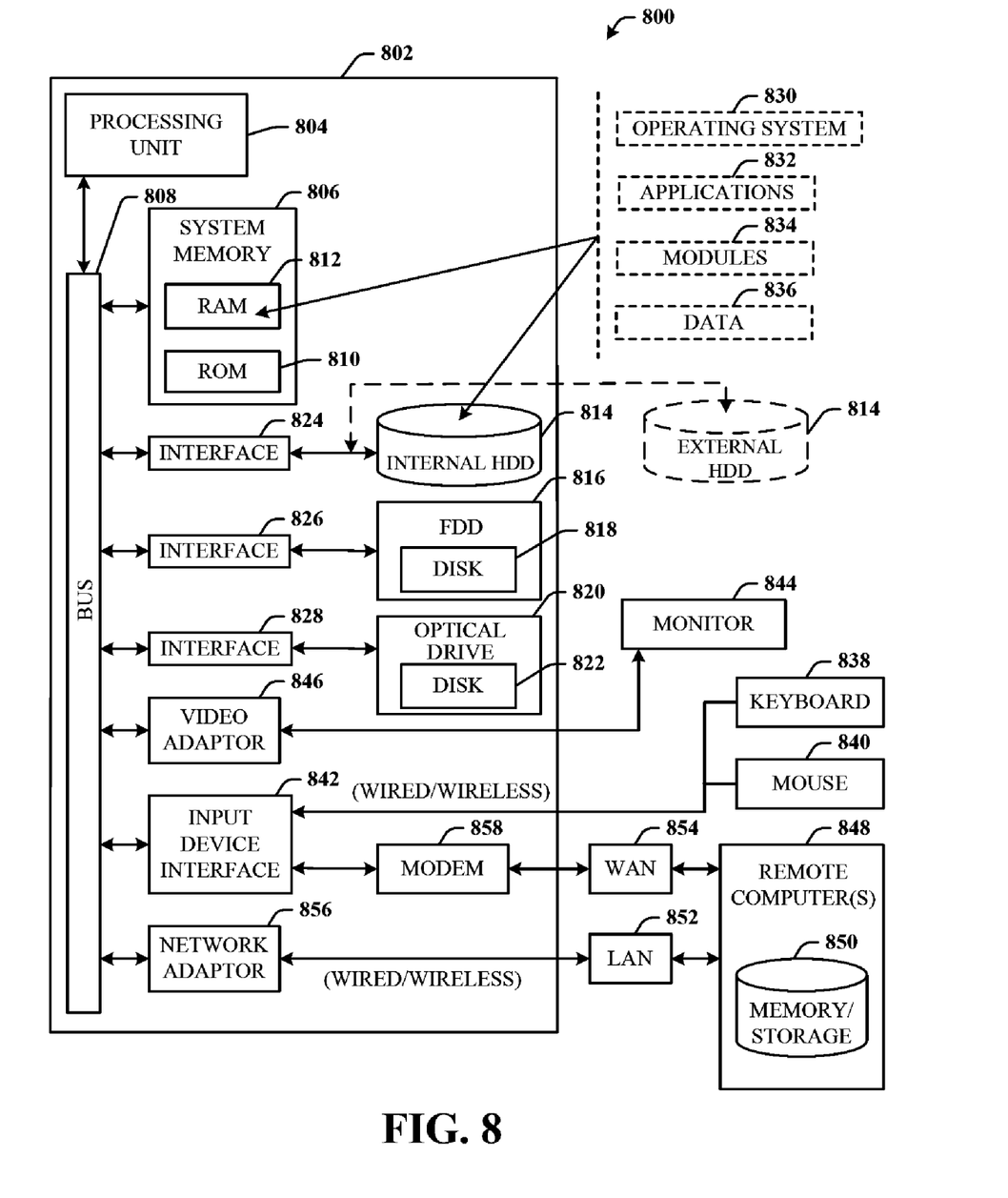
FIG. 8 is a schematic block diagram illustrating a suitable operating environment in accordance with an aspect of the subject invention.

Referring now to FIG. 8, there is illustrated a block diagram of a computer operable to execute the disclosed architecture. In order to provide additional context for various aspects of the subject invention, FIG. 8 and the following discussion are intended to provide a brief, general description of a suitable computing environment 800 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, there is illustrated an exemplary environment 800 for implementing various aspects of the invention that includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the invention can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices, and companies, and facilitate enterprise-wide computer networks, such as intranets, all of which may connect to a global communication network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 9:
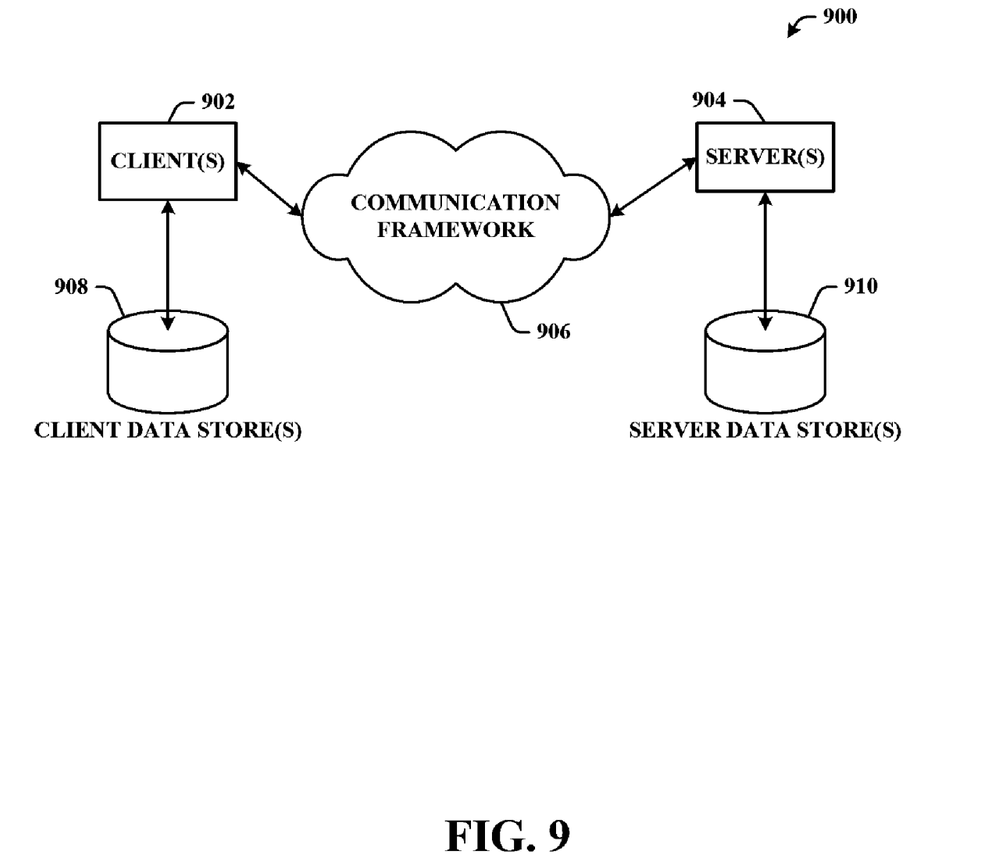
FIG. 9 is a schematic block diagram of a sample-computing environment with which the subject invention can interact.

Referring now to FIG. 9, there is illustrated a schematic block diagram of an exemplary computing environment 900 in accordance with the subject invention. The system 900 includes one or more client(s) 902. The client(s) 902 can be hardware and/or software (e.g., threads, processes, computing devices). The client(s) 902 can house cookie(s) and/or associated contextual information by employing the invention, for example.

The system 900 also includes one or more server(s) 904. The server(s) 904 can also be hardware and/or software (e.g., threads, processes, computing devices). The servers 904 can house threads to perform transformations by employing the invention, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for facilitating customization of de-abstracted design templates, comprising:
 a processor;
 a memory communicatively coupled to the processor, the memory having stored therein computer-executable components that at least partly implement the system, including:
  a transclusion component configured to de-abstract at least one design template according to a requirement of an automation project by appending at least one class specific layer to the at least one design template to generate at least one de-abstracted design template, wherein the at least one class specific layer includes at least one of an industry specific layer, a customer specific layer, an application specific layer, or a project specific layer; and a customization component configured to customize the at least one de-abstracted design template to generate at least one customized de-abstracted design template, and generate at least one design specification for the automation project based at least in part on the at least one customized de-abstracted design template, wherein the at least one design specification includes at least one hardware design specification that specifies at least one hardware module that at least partly implements the automation project.

2. The system of claim 1, wherein the customization component is further configured to customize the at least one de-abstracted design template based on at least one of an input from an interface, an associated application, or a customization schema.

3. The system of claim 1, wherein the computer-executable components further include an interface component configured to allow interaction with at least one of the transclusion component, the customization component, or a data store.

4. The system of claim 3, wherein the interface component is further configured to expose at least one interface that enables at least one of selection of the at least one design template, selection of at least one class specific layer to append to the at least one design template, selection of a transclusion schema, selection of a customization schema, or customization of the at least one de-abstracted design template.

5. The system of claim 1, wherein the transclusion component is further configured to de-abstract the at least one design template based on at least one of a project requirement definition or a functional specification provided to the transclusion component.

6. The system of claim 5, wherein the transclusion component is further configured to determine at least one class specific layer to append to the at least one design template based at least in part on the project requirement definition, the functional specification, an input from an interface, or a transclusion schema.

7. The system of claim 5, wherein the project requirement definition defines at least one of a product to be manufactured, a quality tolerance, or a rate of production.

8. The system of claim 1, wherein at least one of the transclusion component or the customization component employs one or more Holonic agents to facilitate de-abstraction of the at least one design template or customization of the at least one de-abstracted design template.

9. The system of claim 1, wherein the at least one design specification further includes at least one software design specification that specifies a sequence of programmable events that at least partly implement the automation project.

10. The system of claim 1, wherein the industry specific layer defines at least one regulatory detail specific to an industry to which the automation project relates.

11. The system of claim 1, wherein the customer specific layer defines at least one of a pre-selected vendor to be used by the transclusion component to specify the at least one hardware module or a data set required from software specified by the at least one design specification.

12. The system of claim 1, wherein the an application specific layer defines an installation requirement.

13. The system of claim 1, wherein the project specific layer defines at least one of a set of process data required by the automation project or equipment configuration information.

14. A method for facilitating customization of de-abstracted design templates, comprising:
employing one or more processors to facilitate executing computer-executable instructions stored on a computer-readable storage medium to implement acts, comprising:
de-abstracting at least one design template based on a requirement of an industrial project to generate at least one de-abstracted design template, wherein the de-abstracting comprises appending at least one class specific layer to the at least one design template, and wherein the at least one class specific layer includes at least one of an industry specific layer, a customer specific layer, an application specific layer, or a project specific layer;
customizing the at least one de-abstracted design template to generate at least one customized de-abstracted design template; and
generating at least one design specification for the industrial project based at least in part on the at least one customized de-abstracted design template, wherein the at least one design specification includes at least one hardware design specification that specifies at least one hardware module to execute the industrial project.

15. The method of claim 14, wherein the customizing comprises customizing the at least one de-abstracted design template based at least in part on at least one of a manual input, one or more data transfers, or a customization schema.

16. The method of claim 14, further comprising exposing at least one interface that enables interacting with at least one of the de-abstracting the at least one design template or the customizing the at least one de-abstracted design template.

17. The method of claim 16, wherein the at least one interface enables at least one of selecting the at least one design template, selecting at least one class specific layer to append to the at least one design template, selecting a transclusion schema, selecting a customization schema, or customizing the at least one de-abstracted design template.

18. The method of claim 14, further comprising automating via artificial intelligence at least one of the de-abstracting the at least one design template or the customizing the at least one de-abstracted design template.

19. The method of claim 14, wherein the generating the at least one design specification includes generating at least one software design specification that specifies a sequence of programmable events to execute the industrial project.

20. A system for facilitating customization of de-abstracted design templates, comprising:
means for de-abstracting at least one design template in accordance with at least one requirement of an automation project to generate at least one de-abstracted design template, wherein the means for de-abstracting includes means for appending at least one class specific layer to the at least one design template, and wherein the at least one class specific layer includes at least one of an industry specific layer, a customer specific layer, an application specific layer, or a project specific layer;
means for customizing the at least one de-abstracted design template to generate at least one customized de-abstracted design template; and
means for generating at least one design specification for the automation project based at least in part on the at least one customized de-abstracted design template, wherein the at least one design specification includes at least one hardware design specification that identifies at least one hardware component capable of implementing the automation project.

21. The system of claim 20, further comprising means for at least one of selecting the at least one design template, selecting at least one class specific layer to append to the at least one design template, selecting a transclusion schema, selecting a customization schema, or customizing the at least one de-abstracted design template.

22. A computer program product for facilitating customization of de-abstracted design templates, comprising:
 a non-transitory computer-readable medium comprising:
  code that de-abstracts at least one design template based on a project requirement definition for an industrial project to generate at least one de-abstracted design template, wherein the code that de-abstracts comprises code that appends at least one class specific layer to the at least one design template, and wherein the at least one class specific layer includes at least one of an industry specific layer, a customer specific layer, an application specific layer, or a project specific layer; and
  code that customizes the at least one de-abstracted design template to generate at least one customized de-abstracted design template, and generates at least one design specification for the industrial project based at least in part on the at least one customized de-abstracted design template, wherein the at least one design specification includes at least one hardware design specification that designs one or more hardware modules for implementation of the industrial project.

23. The computer program product of claim 22, further comprising code that customizes the at least one de-abstracted design template based at least in part on at least one of a manual input, one or more data transfers, or a customization schema.

24. The computer program product of claim 22, further comprising code that exposes at least one interface that enables interaction with at least one of the de-abstracting the at least one design template or the customizing the at least one de-abstracted design template.

25. The computer program product of claim 24, wherein the at least one interface enables at least one of selecting the at least one design template, selecting at least one class specific layer to append to the at least one design template, selecting a transclusion schema, selecting a customization schema, or customizing the at least one de-abstracted design template.

* * * * *